March 27, 1956  C. H. THAYER  2,739,928
ROTARY CONVERTER PURGING SYSTEM
Filed June 8, 1953  2 Sheets-Sheet 1

INVENTOR.
CLARENCE H. THAYER
BY
Robert D. Spindle
ATTORNEY

March 27, 1956  C. H. THAYER  2,739,928
ROTARY CONVERTER PURGING SYSTEM
Filed June 8, 1953  2 Sheets-Sheet 2

INVENTOR.
CLARENCE H. THAYER
BY
Robert O. Spindle
ATTORNEY

United States Patent Office 2,739,928
Patented Mar. 27, 1956

2,739,928
ROTARY CONVERTER PURGING SYSTEM

Clarence H. Thayer, Wallingford, Pa., assignor to Sun Oil Company, Philadelphia, Pa., a corporation of New Jersey Application June 8, 1953, Serial No. 360,398

6 Claims. (Cl. 196—52)

This invention relates to the method or system of utilizing catalyst or contact material in chemical reactions involving the steps of on-stream, on-stream purge, regeneration and regeneration purge carried out in a cycle of operation. In particular, the invention is directed to the manner of purging the material of on-stream and regeneration fluids without deleteriously affecting the activity of the catalyst or contact material.

The invention is based on the well known fixed or static bed type of operation employing catalyst or contact material, but differs therefrom in that the mass of material is rotated to be in communication in sequence with the various fluids used in a cycle of operation. The invention is useful in carrying out chemical reactions generally but will be considered particularly in connection with reactions involving hydrocarbons and wherein a granular or finely divided catalyst is employed.

In the static or fixed bed type of operation, the hydrocarbon reactants are supplied, during the on-stream period of operation, to the mass of catalyst or contact material for passage therethrough and during this period carbon is deposited on the material which is removed therefrom during a regeneration period of operation. The regeneration is effected by supplying an oxidizing medium such as air to the catalyst mass to effect a burning of the carbon deposit prior to another on-stream period of operation. Following the on-stream period of operation, after the supply of hydrocarbon fluid is cut-off, an inert purging fluid such as steam is supplied to the catalyst mass in order to remove any on-stream fluid or products prior to the regeneration period of operation. Also, between the regeneration period and subsequent on-stream period of operation, after the supply of regeneration medium is cut off, purging fluid is again supplied to the catalyst mass to remove any regeneration fluid or products. This well known cycle of operation which the catalyst mass undergoes then is in four predetermined timed steps comprising the "on-stream," "purge," "regeneration" and "purge" periods of operation.

The method of the present invention is applicable particularly to the rotary type of reactor, that is, one in which the catalyst is maintained within a vessel which is rotated and during rotation the various reactants are supplied simultaneously and continuously to the mass and the various products removed simultaneously and continuously from the mass by fluid compartments which are fixed with respect to the rotating mass of material.

With this general type of reactor the various fluids may be supplied for passage axially of the rotating mass or they may be supplied for passage radially of the mass. The application filed by me September 14, 1953, Serial No. 380,027, as a consolidation of certain earlier filed applications (later allowed, and issued March 22, 1955, as Patent No. 2,704,741), discloses rotary reactors which are designed for the radial passage of the various fluids through the catalyst between fixed inner and outer fluid compartments.

Steam purging of the catalyst has been used commercially and is effective but it has been found that steam used over extended periods of time or at high pressures has a deleterious effect on the activity of the catalyst. For this reason commercial operations have resorted to purging under vacuum or to a combination of steam and vacuum purging.

The method of purging of the present invention utilizes a selected portion of the products from the regeneration zone which is low in $O_2$ content for both the oil purge and regeneration purge. This selected portion permits the purging steps to be carried out effectively and without burning the catalyst or without adversely affecting its activity. The portion of the regeneration products which are high in $O_2$ content provide an energy source for operating equipment used in supplying the regeneration medium to the system, such, for example, as a turbocompressor unit. A feature of the invention incidental to the principal purging operation but nevertheless important, is in utilizing products from the oil purge in an economic manner, for example, in the production of steam and also to assist in operating the equipment for supplying the regeneration medium.

For a more detailed explanation of the invention reference may be had to accompanying drawings in which.

Figure 1:
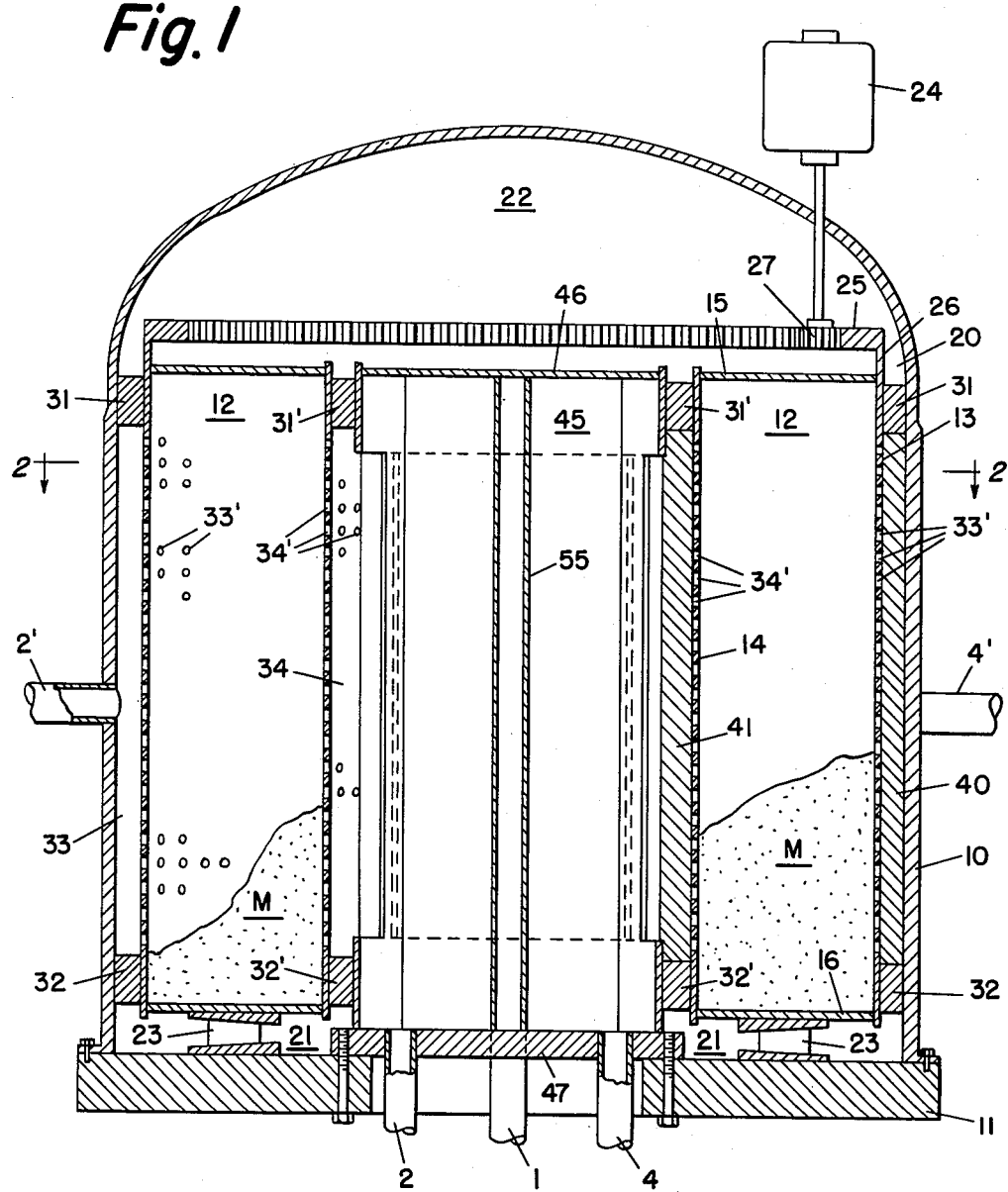
Figure 1 is a vertical sectional view through a radial flow rotary type of converter.

Referring to Figure 1, 10 indicates an outer cylindrical casing which is suitably fixed, as by flanging, to a supporting head 11. The casing 10 is made pressure tight and encloses a vessel which contains the catalyst or contact material as well as the apparatus forming the fluid compartments for the supply of the different starting fluids to the vessel and the removal of different products from the vessel and also some of the elements for effecting rotation of the vessel.

The vessel 12 which contains the catalyst is annular in shape and formed by an outer cylindrical sidewall 13 and inner cylindrical sidewall 14 which are concentric and interconnected by annular end plates 15 and 16 respectively.

The vessel 12 and associated elements form an assembly which is disposed within the casing 10 to provide an outer annular space 20, with its outer sidewall, a lower space 21, with the supporting head 11 and an enlarged space 22 with the upper end of the casing and with the inner sidewall 14 of the reaction vessel. A set of rollers 23 are provided within the lower space 21 to rotatably support the vessel 12 which is driven by a motor 24 suitably connected to a ring-gear 25, formed on extension 26, through a pinion gear 27.

The space 20 is divided by circumferential seals, comprising a pair of circular blocks 31 and 32 positioned in spaced relation to form therebetween an outer annular fluid zone 33 while the space 22 is similarly divided by circumferential seals comprising circular blocks 31' and 32' positioned in spaced relation to form an inner annular fluid zone 34 therebetween. The fluid zones 33 and 34 communicate with each other through apertures 33' and 34' formed in the vessel outer and inner walls respectively, so that fluid reactants supplied to one of the zones may pass through the contact material M in the vessel 12 and products may be removed from the other zone.

Figure 2:
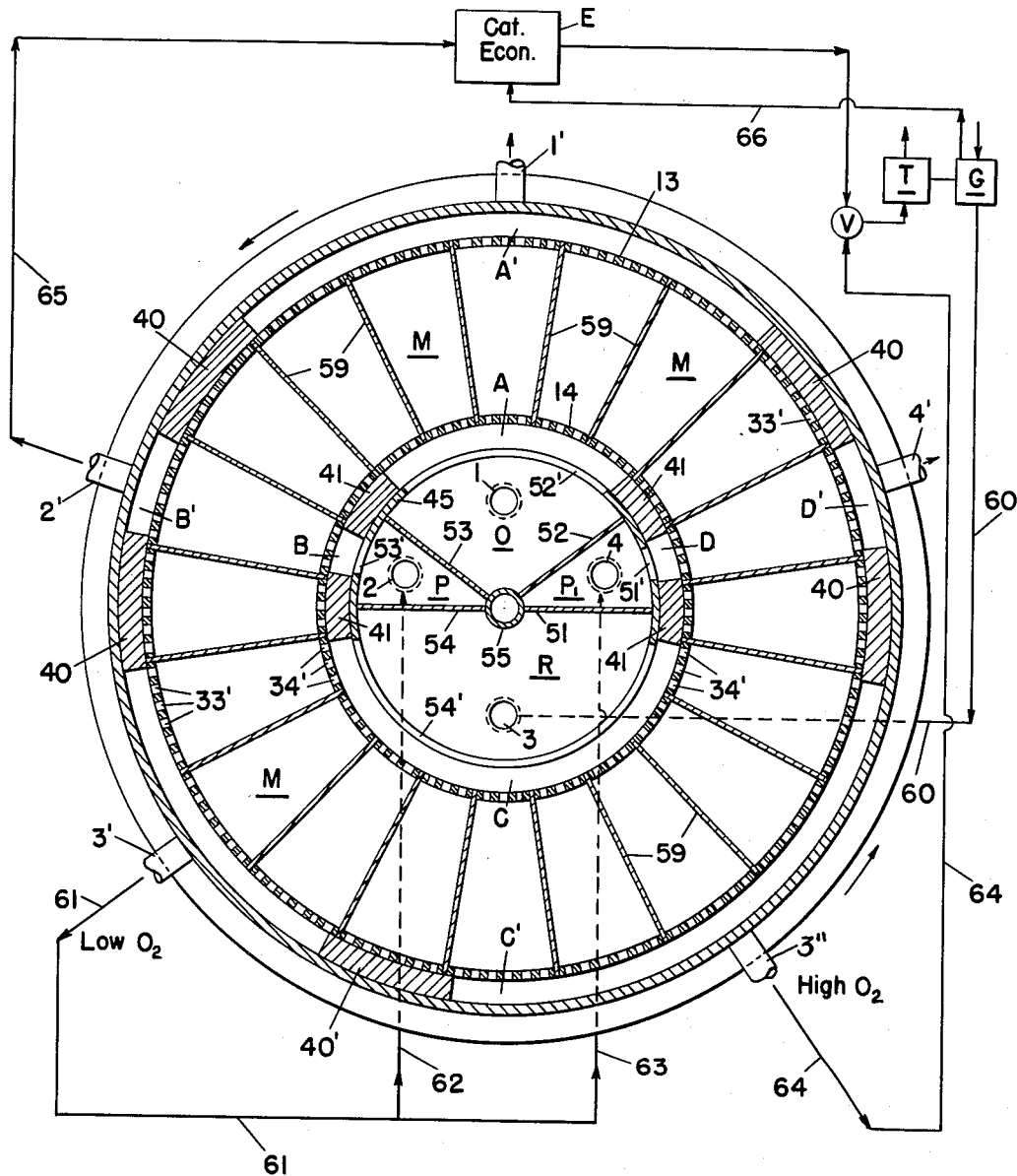
Figure 2 is a horizontal sectional view taken on the line 2—2 of Figure 1 and showing the flow diagram of the present invention.

The outer fluid zone 33 is further divided by a plurality of vertical seals, comprising elongate blocks 40, and the inner fluid zone 34 is divided by vertical seals 41, comprising similar blocks. Referring to Figure 2, it will be seen that four outer vertical seals 40 and four inner vertical seals 41 are provided and that each inner seal is aligned radially with an outer seal. The circumferential and vertical seals are arranged to provide a set of inner fluid compartments which are separate and independent and a set of outer fluid compartments which are separate and independent in order that fluids in adjacent inner or outer compartments will not commingle but that fluids may be distributed across the contact material from an inner compartment to a cooperating outer compartment.

In Figure 1 an inner cylindrical casing 45 having end walls 46 and 47 is positioned within the enlarged space 22 concentrically with casing 10 and is provided, as shown in Figure 2, with a plurality of radial partitions 51, 52, 53, and 54, which extend between the upper and lower ends 46 and 47 of the inner casing and have their inner edges secured to a central post 55 and their outer edges secured to the inner wall of casing 45, dividing the casing into independent fluid sections, O, P, R, and $P_1$ for the oil, purge, regeneration and purge fluids, respectively. The spacing of the partitions and, hence, the size of the various fluid sections may vary in accordance with the desired time periods on stream with the oil or in regeneration with air of oxidizing fluid since the purge periods may be short relative to the on-stream and regeneration periods. Each radial partition is aligned with an inner and outer vertical seal in order to divide the casing into a number of sections equal to the number of vertical seals. As shown in Figure 2, slotted openings 51', 52', 53', and 54' are provided in the casing 45 between adjacent partitions placing the sections O, P, R, and $P_1$ in communication with inner compartments A, B, C, and D, respectively. Inner compartments A, B, C, and D will be in communication through openings 33' and 34' with the cooperating outer compartments A', B', C', and D' respectively, formed between adjacent outer vertical seals 40, thus providing pairs of inner and outer cooperating compartments A—A', B—B', C—C', and D—D', which are in communication with each other.

Conduits indicated at 1, 2, 3, and 4 are provided, within the sections formed in casing 45, for supplying fluids to or removing fluids from compartments A, B, C, and D and cooperating conduits 1', 2', 3', and 4' are provided for supplying fluid to or removing fluid from the outer compartments A', B', C', and D'.

In Figure 2 the vessel 12 is also shown as divided by a plurality of generally equally spaced apart radial vanes 59, which extend from its upper end wall 15 to the lower end wall 16 and are suitably secured between its outer and inner walls 13 and 14 in order to form independent chambers for the catalyst or contact material M. Instead of being divided into vertical catalyst chambers the vessel may be provided with vertical rows of radial tubes as described in my copending application Serial No. 380,027, Patent No. 2,704,741. Each of the contact material chambers are in communication with both an inner fluid compartment and its cooperating outer fluid compartment through the apertures 33' and 34', then as the vessel is rotated in a counterclockwise direction, as indicated by the arrows, each contact material chamber will advance or rotate to be in communication in sequence with each pair of the cooperating inner and outer fluid compartments A—A', B—B', C—C', and D—D'.

In order to prevent fluids in adjacent inner compartments from entering any one catalyst chamber at the same time the inner vertical seals will be at least as wide and preferably slightly wider than the distance between the inner edges of adjacent radial vanes 59, and similarly the outer vertical seals will be at least as wide and preferably slightly wider than the distance between the outer edges of the adjacent radial vanes. From an inspection of Figure 2 it will be seen that as the vessel 12 is rotated the vertical seals 40 and 41 will cover the openings 33' and 34' between the outer and inner edges of adjacent vanes 59 so that any chamber formed between any pair of adjacent vanes can only be in communication with one pair of cooperating inner and outer fluid compartments at any one time since the vertical seals will at all times block off the passage of fluids from the next adjacent pair of cooperating compartments.

Referring to the flow diagram portion of Figure 2, the oxidizing medium, such as air is supplied by compressor G, which is driven by turbine T, to line 60 at about 25 p. s. i. g. and then to conduit 3. Conduit 3 is in communication with the regeneration section located between compartments C—C' and from inner compartment C the air is distributed by the apertures 34' radially across the contact material M in the group of chambers located in the regeneration section and the regeneration fumes or products are collected in outer compartment C'. As each catalyst chamber leaves the purging section, which is located between compartments B—B' and enters the regeneration section located between compartments C—C', the catalyst mass therein has its greatest carbonaceous deposit. Then as each chamber advances through the regeneration zone the deposit will be burned and the mass become regenerated at some stage or position therein before each chamber reaches the end of the regeneration zone. The initial stages of the regeneration will require the greatest amounts of oxygen and as each chamber of catalyst continues through the regeneration zone less oxygen will be required, since there is less deposit to be burned. The regeneration air as it enters compartment C contains 21 per cent oxygen and the products of regeneration entering the first portion of compartment C' due to the greater burning in the initial stages of the regeneration will be low in $O_2$ content and contain from 1 to 3 per cent of oxygen while the products from the later stages entering the last portion of compartment C' will be high in $O_2$ content and contain from about 10 to 15 per cent oxygen. In order to separately and conveniently remove those products which are low in $O_2$ content and those which are high in $O_2$ content an extra vertical seal 40' is fitted within the outer compartment C' and positioned on a line where it has been determined that the regeneration is completed or substantially completed and the products which are low in $O_2$ content may be withdrawn continuously by conduit 3' while the products which are high in $O_2$ content may be withdrawn continuously by another conduit 3''.

The products which are low in $O_2$ content pass from conduit 3' to line 61 and a portion is sent by line 62 to conduit 2 in purging zone P while another portion may be sent conveniently by line 63 to conduit 4 in purging zone $P_1$. From conduit 2 the purging medium enters the inner compartment B and is distributed across this purging zone where the oil is purged from the catalyst mass and the purge products collected in outer compartment B'. Since the products from this purge zone will contain substantial amounts of oil in addition to CO they are preferably sent directly by line 65 to economizer E wherein the oil and CO are burned. In order to expedite the burning in E fresh air is supplied conveniently by line 66 from the compressor G.

The economizer E will preferably contain an oxidizing catalyst such as a platinum compound to provide for the most complete burning and the heat energy developed in E may be used in the production of steam and gaseous products sent to turbine T to assist in its operation.

Since the products from the purge zone located between compartments D—D' contain no economically recoverable material they are directed by conduit 4' from compartment D' and may be removed from the system.

The regeneration products which are high in $O_2$ content are sent directly by line 64 to the turbine T where their heat energy is utilized in compressing the air which is supplied to the regeneration zone by line 60. As mentioned heretofore the regeneration air enters compartment C at about 25 p. s. i. g. and the products of regeneration enter the turbine T from line 64 at about 20 p. s. i. g. wherein they expand to assist in operating the turbine for supplying the regeneration air.

The invention claimed is:

1. In a process in which a rotatable series of catalyst units are each contacted, successively, with a fluid hydrocarbon reactant to convert it to other hydrocarbons, with a purging fluid to remove hydrocarbons deposited thereon during the hydrocarbon conversion step, with a fluid oxidizing medium reactant to regenerate the catalyst to remove carbonaceous materials deposited thereon during the hydrocarbon conversion step, and with a purging fluid to remove regeneration products formed during the immediately preceding step: the improvement which comprises dividing the fluid products of the regenerating step into a plurality of streams one of which streams discharges from the catalytic units that have earlier received the oxidizing medium and is relatively low in $O_2$ content and the other of which streams discharges from the catalytic units that have later received the oxidizing medium and is relatively high in $O_2$, and utilizing the fluid products of the first stream as the purging fluid for one or both of the said purging steps.

2. In a process in which a rotatable series of catalyst units are each contacted, successively, with a fluid hydrocarbon reactant to convert it to other hydrocarbons, with a purging fluid to remove hydrocarbons deposited thereon during the hydrocarbon conversion step, with a fluid oxidizing medium reactant to regenerate the catalyst to remove carbonaceous materials deposited thereon during the hydrocarbon conversion step, and with a purging fluid to remove regeneration products formed during the immediately preceding step: the improvement which comprises dividing the fluid products of the regenerating step into a plurality of streams one of which streams discharges from the catalytic units that have earlier received the oxidizing medium and is relatively low in $O_2$ content and the other of which streams discharges from the catalytic units that have later received the oxidizing medium and is relatively high in $O_2$, and utilizing the fluid products of the first stream as the purging fluids for the said purging steps, burning out the combustible constituents of the fluid products discharged from the first purging step and utilizing the heat energy thus derived to assist in the compression of the oxidizing medium in the course of its flow to catalytic units undergoing regeneration.

3. In a process in which a rotatable series of catalyst units are each contacted, successively, with a fluid hydrocarbon reactant to convert it to other hydrocarbons, with a purging fluid to remove hydrocarbons deposited thereon during the hydrocarbon conversion step, with a fluid oxidizing medium reactant to regenerate the catalyst to remove carbonaceous materials deposited thereon during the hydrocarbon conversion step, and with a purging fluid to remove regeneration products formed during the immediately preceding step: the improvement which comprises dividing the fluid products of the regenerating step into a plurality of streams one of which streams discharges from the catalytic units that have earlier received the oxidizing medium and is relatively low in $O_2$ content and the other of which streams discharges from the catalytic units that have later received the oxidizing medium and is relatively high in $O_2$, and utilizing the fluid products of the first stream as the purging fluid for one or both of the said purging steps and utilizing the heat energy of the fluid products of the second stream in compressing the oxidizing medium in its conveyance to the catalyst for catalytic regeneration.

4. The process defined in claim 2 in which the heat energy of the fluid products of the second stream is utilized in the compression of the oxidizing medium in its conveyance to the catalyst for catalytic regeneration.

5. In a catalytic hydrocarbon conversion plant comprising inner and outer fixed casings and between and concentric with said casings and spaced from both a revoluble converting vessel to thereby provide circumferential spaces one within and the other without the revoluble conversion vessel, a multiplicity of catalyst chambers, arranged circumferentially of the converter, into which the revoluble conversion vessel is divided, each of which communicates with both said circumferential spaces and providing for substantially radial fluid flow from the inner circumferential space to the outer circumferential space, seals dividing each circumferential space into four arcuate spaces, said seals comprising four sets of vertically extending seals, each set comprising a pair of seals in substantial radial alignment, one in the inner, and the other in the outer, circumferential space; means to introduce into one inner arcuate space a hydrocarbon to be converted to other hydrocarbons, the next adjacent inner arcuate space adapted to receive a purging fluid, power means to convey to the next adjacent inner arcuate space an oxidizing medium, the next adjacent inner arcuate zone adapted to receive a purging fluid: the improvement which comprises an additional vertically extending seal between the ends of the outer arcuate space arranged to receive the fluid products of regeneration discharged from the catalyst chambers which at any given time are receiving said oxidizing medium, said additional seal dividing the last named arcuate space into two arcuate zones, one communicating with the catalyst chambers earlier receiving said oxidizing medium and the other communicating with the catalyst chambers later receiving said oxidizing medium, and means to convey, as purging fluid, the reaction products from the first of said arcuate zones to one or both of the inner arcuate spaces hereinbefore specified as adapted to receive purging fluid.

6. The hydrocarbon conversion plant defined in claim 5 comprising also means to convey the reaction products from the said other arcuate zone to said power means to assist in the compression of the oxidizing medium conveyed to the catalyst for catalytic regeneration.

References Cited in the file of this patent

UNITED STATES PATENTS

| Number | Name | Date |
|---|---|---|
| 2,246,345 | Campbell | Jan. 17, 1941 |
| 2,334,555 | Howard | Nov. 16, 1943 |
| 2,347,829 | Karlson et al. | May 2, 1944 |
| 2,449,096 | Wheeler | Sept. 14, 1948 |
| 2,639,000 | Edwards | May 19, 1953 |